United States Patent
Bao et al.

(10) Patent No.: US 12,074,815 B2
(45) Date of Patent: Aug. 27, 2024

(54) RESOURCE ALLOCATION FOR REPEATER-ASSISTED POSITIONING REFERENCE SIGNAL (PRS) TRANSMISSION

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/361,881

(22) Filed: Jun. 29, 2021

(65) Prior Publication Data

US 2022/0416967 A1    Dec. 29, 2022

(51) Int. Cl.
  *H04L 5/00*   (2006.01)
  *H04B 7/155*  (2006.01)
  *H04W 56/00*  (2009.01)

(52) U.S. Cl.
  CPC ....... *H04L 5/0048* (2013.01); *H04B 7/15507* (2013.01); *H04W 56/004* (2013.01)

(58) Field of Classification Search
  CPC .............. H04L 5/0048; H04L 5/0094; H04B 7/15507; H04W 56/004; H04W 16/26; H04W 64/00
  See application file for complete search history.

(56) References Cited

U.S. PATENT DOCUMENTS

| | | | | |
|---|---|---|---|---|
| 11,856,591 | B2* | 12/2023 | Manolakos | H04W 72/51 |
| 2009/0028549 | A1* | 1/2009 | Zhang | H04B 10/035 |
| | | | | 398/16 |
| 2010/0110942 | A1* | 5/2010 | Cai | H04W 72/541 |
| | | | | 370/279 |
| 2010/0167743 | A1* | 7/2010 | Palanki | H04B 7/155 |
| | | | | 455/67.11 |
| 2011/0177777 | A1* | 7/2011 | Kim | H04B 7/155 |
| | | | | 455/9 |
| 2012/0063492 | A1* | 3/2012 | Palanki | H04W 56/001 |
| | | | | 375/211 |
| 2012/0208523 | A1 | 8/2012 | Hans et al. | |

(Continued)

OTHER PUBLICATIONS

Huawei et al., "Correction to the Need Code for Downlink LPP Message", 3GPP TSG-RAN WG2 Meeting #113-e, R2-2101827, 3rd Generation Partnership Project, Mobile Competence Centre, 650, Route Des Lucioles, F-06921 Sophia-Antipolis Cedex, France, vol. RAN WG2, No. Electronic, Jan. 25, 2021-Feb. 5, 2021, 8 Pages, Jan. 15, 2021, XP051974691, pp. 7,8.

(Continued)

*Primary Examiner* — Hoang-Chuong Q Vu
(74) *Attorney, Agent, or Firm* — Thien T. Nguyen

(57) ABSTRACT

Disclosed are techniques for wireless communication. In an aspect, a repeater receives, from a network entity, a positioning reference signal (PRS) configuration or an indicator of the PRS configuration, the PRS configuration specifying one or more PRS resources of one or more PRS resource sets, and transmits, to one or more user equipments (UEs), a PRS waveform representing the one or more PRS resources of the one or more PRS resource sets in accordance with the PRS configuration.

18 Claims, 14 Drawing Sheets

(56) References Cited

U.S. PATENT DOCUMENTS

| | | | |
|---|---|---|---|
| 2013/0294391 A1* | 11/2013 | Guo | H04W 72/23 |
| | | | 370/329 |
| 2014/0171111 A1* | 6/2014 | Xiao | H04W 64/00 |
| | | | 455/456.1 |
| 2014/0192781 A1* | 7/2014 | Teyeb | H04W 36/34 |
| | | | 370/328 |
| 2017/0237831 A1 | 8/2017 | Yang et al. | |
| 2019/0239181 A1* | 8/2019 | Gangakhedkar | H04W 76/10 |
| 2020/0296680 A1* | 9/2020 | Akkarakaran | H04W 4/029 |
| 2021/0120522 A1* | 4/2021 | Kim | H04W 80/02 |
| 2021/0329417 A1* | 10/2021 | Priyanto | G01S 1/20 |
| 2022/0015057 A1* | 1/2022 | Bao | H04W 76/14 |
| 2022/0060854 A1* | 2/2022 | Liu | H04W 4/025 |
| 2022/0086794 A1* | 3/2022 | Lee | G01S 1/0428 |
| 2022/0191817 A1* | 6/2022 | Michalopoulos | G01S 5/10 |
| 2022/0322277 A1* | 10/2022 | Duan | H04B 17/27 |
| 2023/0076306 A1* | 3/2023 | Gunnarsson | H04B 7/024 |
| 2023/0101862 A1* | 3/2023 | Manolakos | G01S 5/0036 |
| | | | 455/456.6 |
| 2023/0109028 A1* | 4/2023 | Wang | H04W 4/029 |
| | | | 455/456.1 |
| 2023/0319764 A1* | 10/2023 | Shreevastav | H04L 5/0057 |
| | | | 455/456.1 |

OTHER PUBLICATIONS

International Search Report and Written Opinion—PCT/US2022/072057—ISA/EPO—Nov. 10, 2022.

ZTE: "OTDOA for eMTC", 3GPP TSG RAN WG1 Meeting #87, R1-1612601 OTDOA EMTC, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, 4 Pages, XP051176546, section 2.

Partial International Search Report—PCT/US2022/072057—ISA/EPO—Aug. 10, 2022.

* cited by examiner

RESOURCE ALLOCATION FOR REPEATER-ASSISTED POSITIONING REFERENCE SIGNAL (PRS) TRANSMISSION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a repeater includes receiving, from a network entity, a positioning reference signal (PRS) configuration or an indicator of the PRS configuration, the PRS configuration specifying one or more PRS resources of one or more PRS resource sets; and transmitting, to one or more user equipments (UEs), a PRS waveform representing the one or more PRS resources of the one or more PRS resource sets in accordance with the PRS configuration.

In an aspect, a method of wireless communication performed by a repeater includes receiving, from a base station, one or more positioning reference signal (PRS) resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent user equipments (UEs) from measuring the one or more PRS resources; and transmitting the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources.

In an aspect, a method of wireless communication performed by a user equipment (UE) includes receiving, from a network entity, configuration information for one or more positioning reference signal (PRS) resources of a PRS resource set, the configuration information including at least an indication that the one or more PRS resources are compressed in a frequency domain and a start point of the one or more PRS resources in the frequency domain; and receiving, from a base station, the one or more PRS resources based on the configuration information.

In an aspect, a repeater includes a memory; at least one transceiver; and at least one processor communicatively coupled to the memory and the at least one transceiver, the at least one processor configured to: receive, via the at least one transceiver, from a network entity, a positioning reference signal (PRS) configuration or an indicator of the PRS configuration, the PRS configuration specifying one or more PRS resources of one or more PRS resource sets; and transmit, via the at least one transceiver, to one or more user equipments (UEs), a PRS waveform representing the one or more PRS resources of the one or more PRS resource sets in accordance with the PRS configuration.

In an aspect, a repeater includes a memory; at least one transceiver; and at least one processor communicatively coupled to the memory and the at least one transceiver, the at least one processor configured to: receive, via the at least one transceiver, from a base station, one or more positioning reference signal (PRS) resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent user equipments (UEs) from measuring the one or more PRS resources; and transmit, via the at least one transceiver, the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources.

In an aspect, a user equipment (UE) includes a memory; at least one transceiver; and at least one processor communicatively coupled to the memory and the at least one transceiver, the at least one processor configured to: receive, via the at least one transceiver, from a network entity, configuration information for one or more positioning reference signal (PRS) resources of a PRS resource set, the configuration information including at least an indication that the one or more PRS resources are compressed in a frequency domain and a start point of the one or more PRS resources in the frequency domain; and receive, via the at least one transceiver, from a base station, the one or more PRS resources based on the configuration information.

In an aspect, a repeater includes means for receiving, from a network entity, a positioning reference signal (PRS) configuration or an indicator of the PRS configuration, the PRS configuration specifying one or more PRS resources of one or more PRS resource sets; and means for transmitting, to one or more user equipments (UEs), a PRS waveform representing the one or more PRS resources of the one or more PRS resource sets in accordance with the PRS configuration.

In an aspect, a repeater includes means for receiving, from a base station, one or more positioning reference signal (PRS) resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent user equipments (UEs) from measuring the one or more PRS resources; and means for transmitting the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources.

In an aspect, a user equipment (UE) includes means for receiving, from a network entity, configuration information for one or more positioning reference signal (PRS) resources of a PRS resource set, the configuration information including at least an indication that the one or more PRS resources are compressed in a frequency domain and a start point of the one or more PRS resources in the frequency domain; and means for receiving, from a base station, the one or more PRS resources based on the configuration information.

In an aspect, a non-transitory computer-readable medium stores computer-executable instructions that, when executed by a repeater, cause the repeater to: receive, from a network entity, a positioning reference signal (PRS) configuration or an indicator of the PRS configuration, the PRS configuration specifying one or more PRS resources of one or more PRS resource sets; and transmit, to one or more user equipments (UEs), a PRS waveform representing the one or more PRS resources of the one or more PRS resource sets in accordance with the PRS configuration.

In an aspect, a non-transitory computer-readable medium stores computer-executable instructions that, when executed by a repeater, cause the repeater to: receive, from a base station, one or more positioning reference signal (PRS) resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent user equipments (UEs) from measuring the one or more PRS resources; and transmit the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources.

In an aspect, a non-transitory computer-readable medium stores computer-executable instructions that, when executed by a user equipment (UE), cause the UE to: receive, from a network entity, configuration information for one or more positioning reference signal (PRS) resources of a PRS resource set, the configuration information including at least an indication that the one or more PRS resources are compressed in a frequency domain and a start point of the one or more PRS resources in the frequency domain; and receive, from a base station, the one or more PRS resources based on the configuration information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
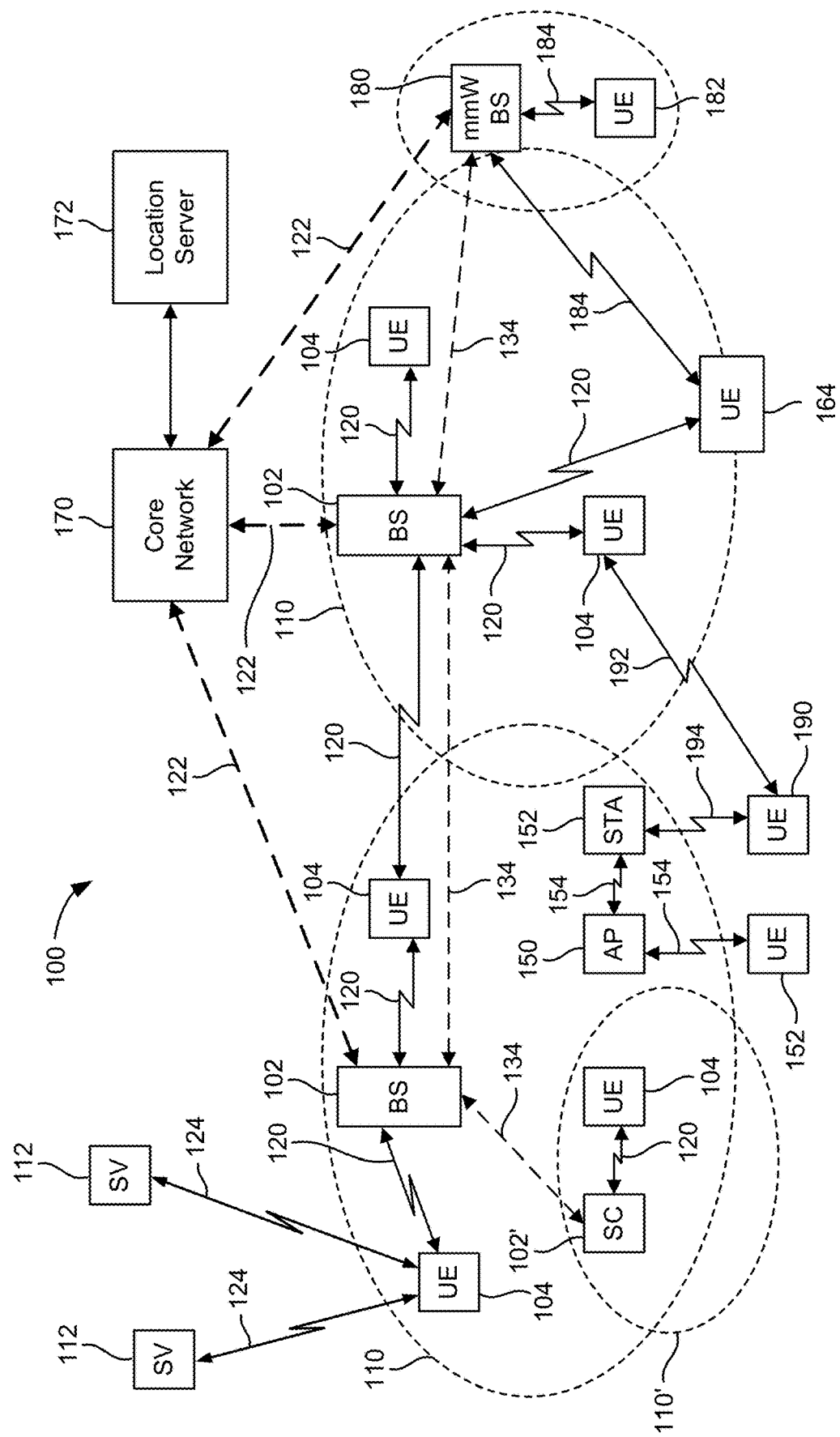
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave (or waveform) of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
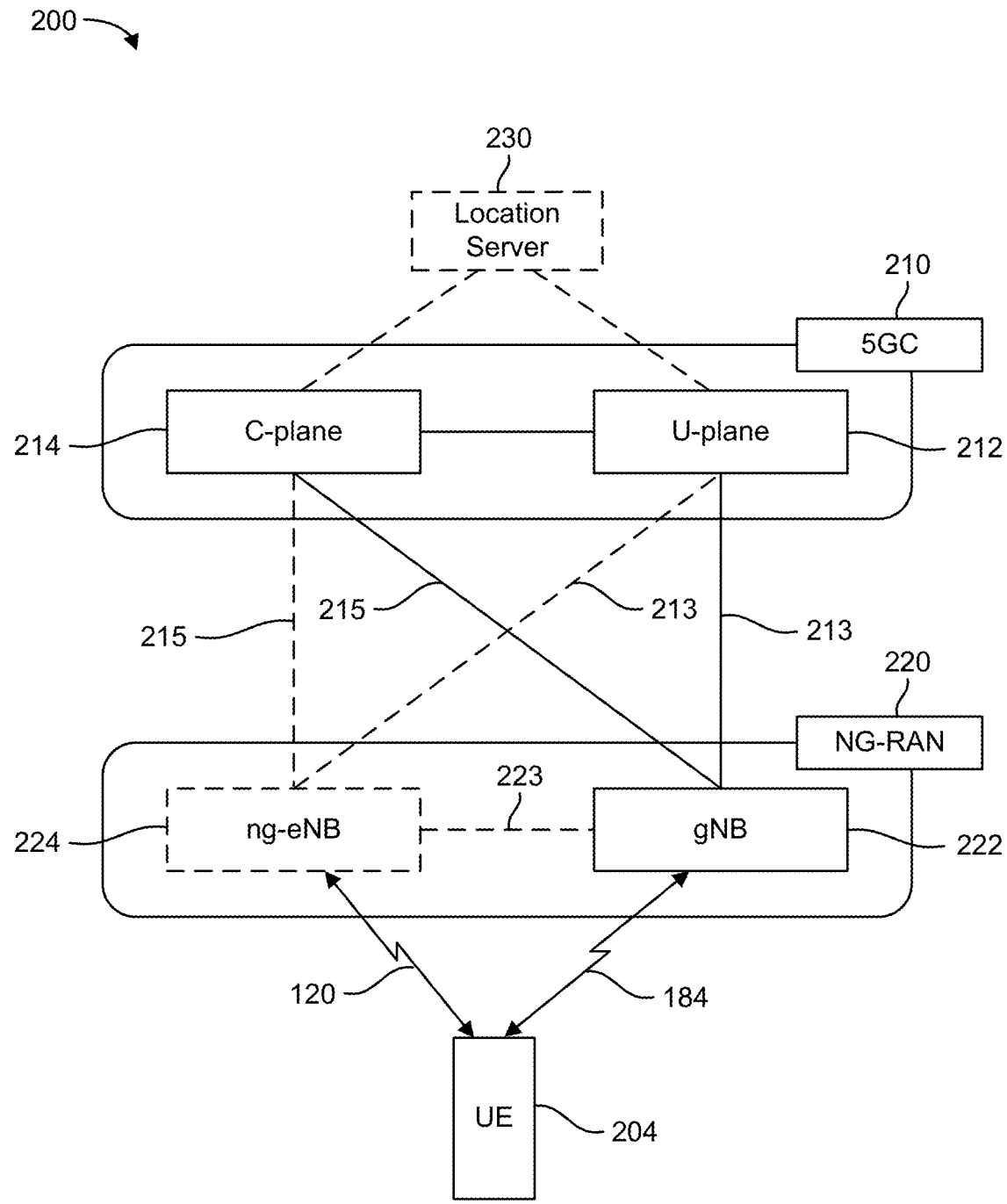
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
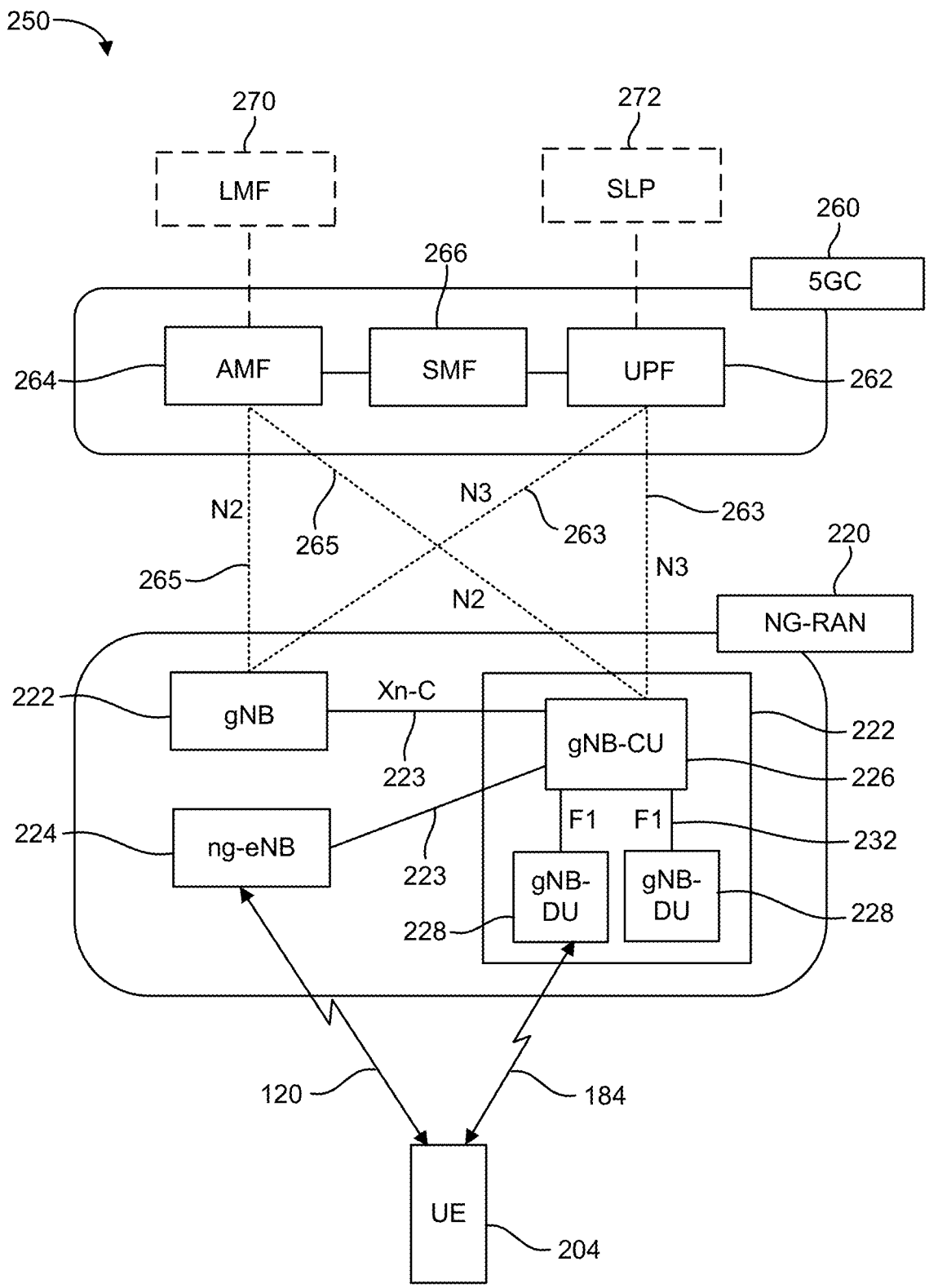

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270

(which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
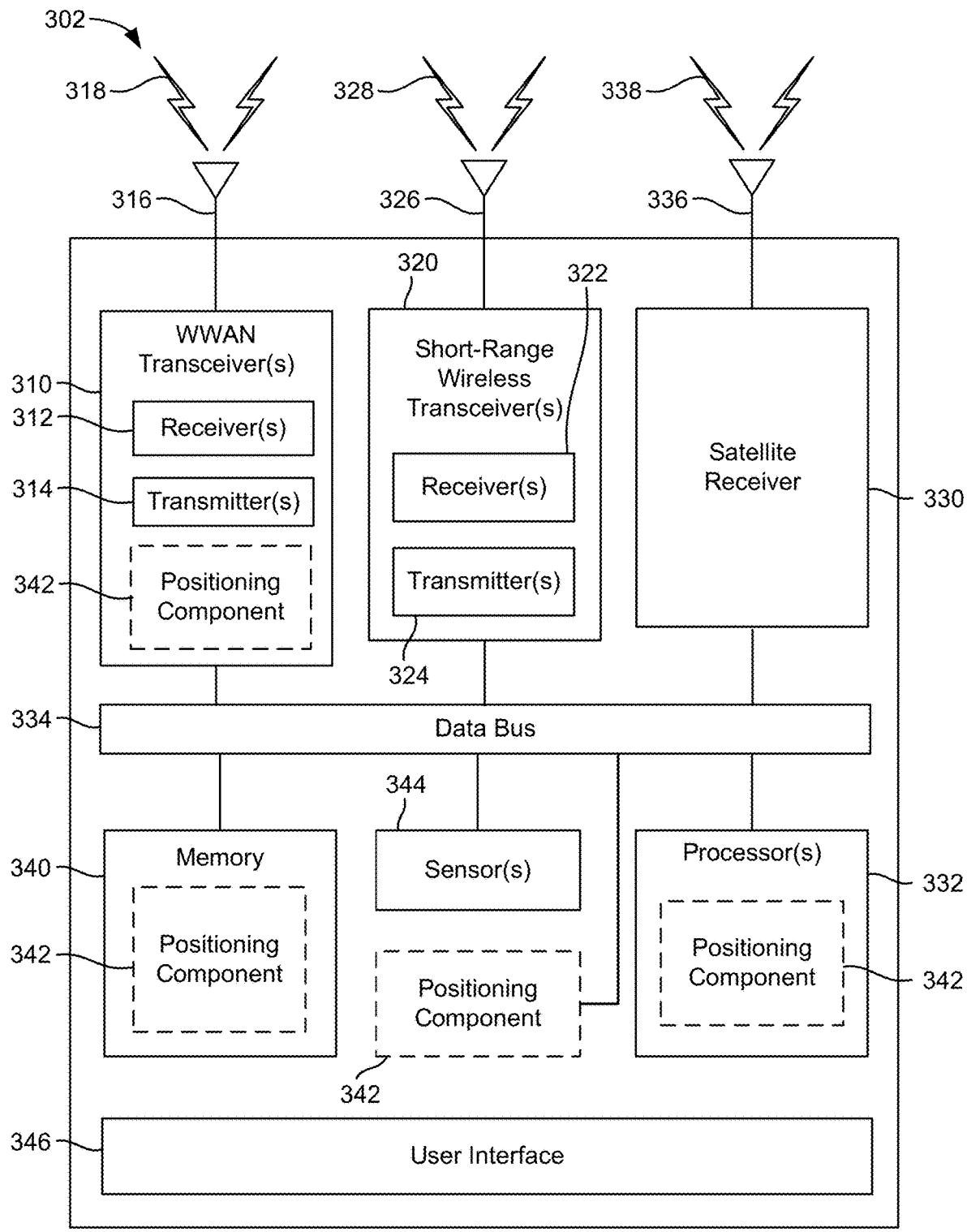
FIGS. 3A, 3B, and 3C are simplified block diagrams of several sample aspects of components that may be employed in a user equipment (UE), a base station, and a network entity, respectively, and configured to support communications as taught herein.
Figure 3B:
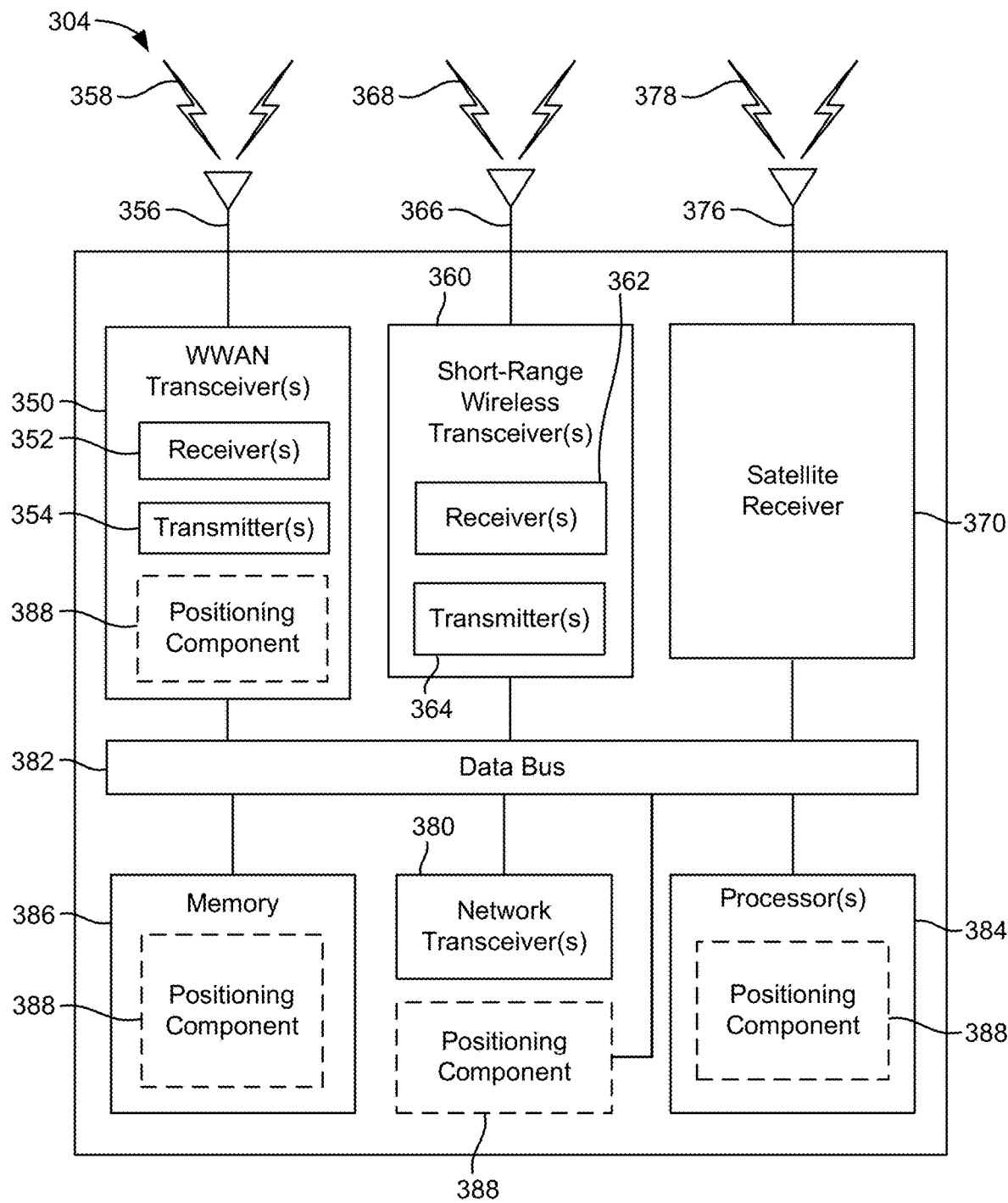
Figure 3C:
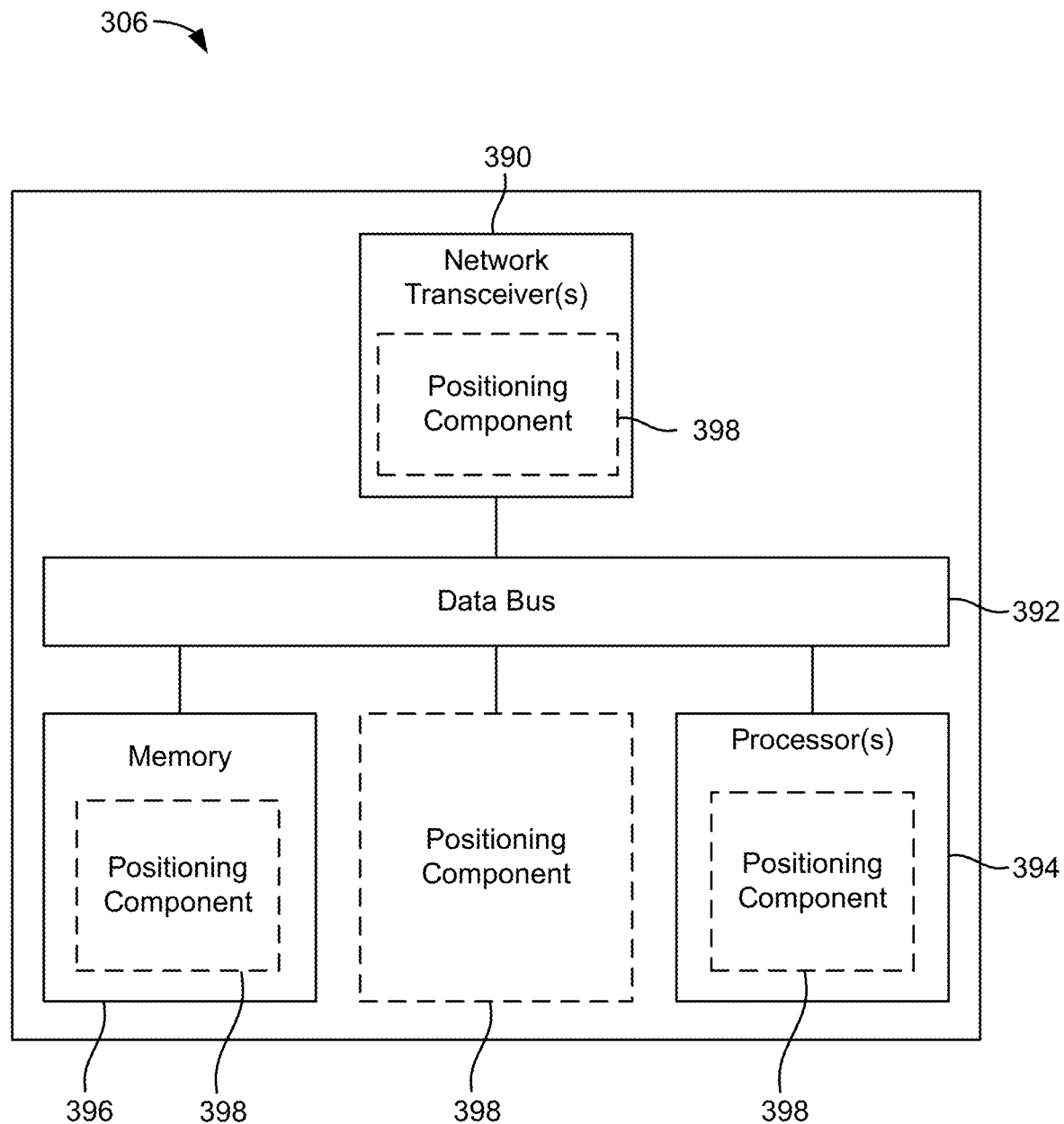

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
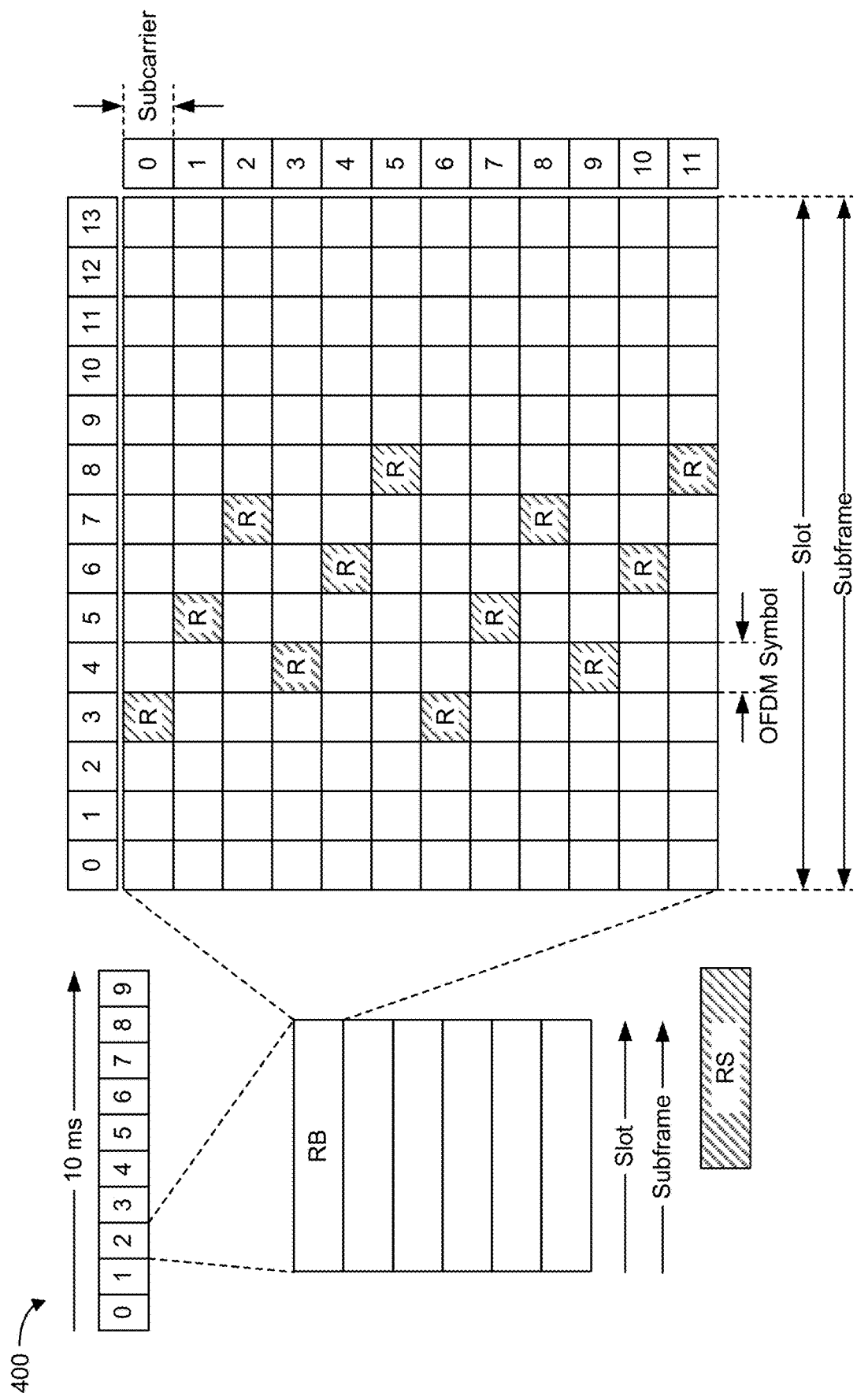
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the Subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying reference signals (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
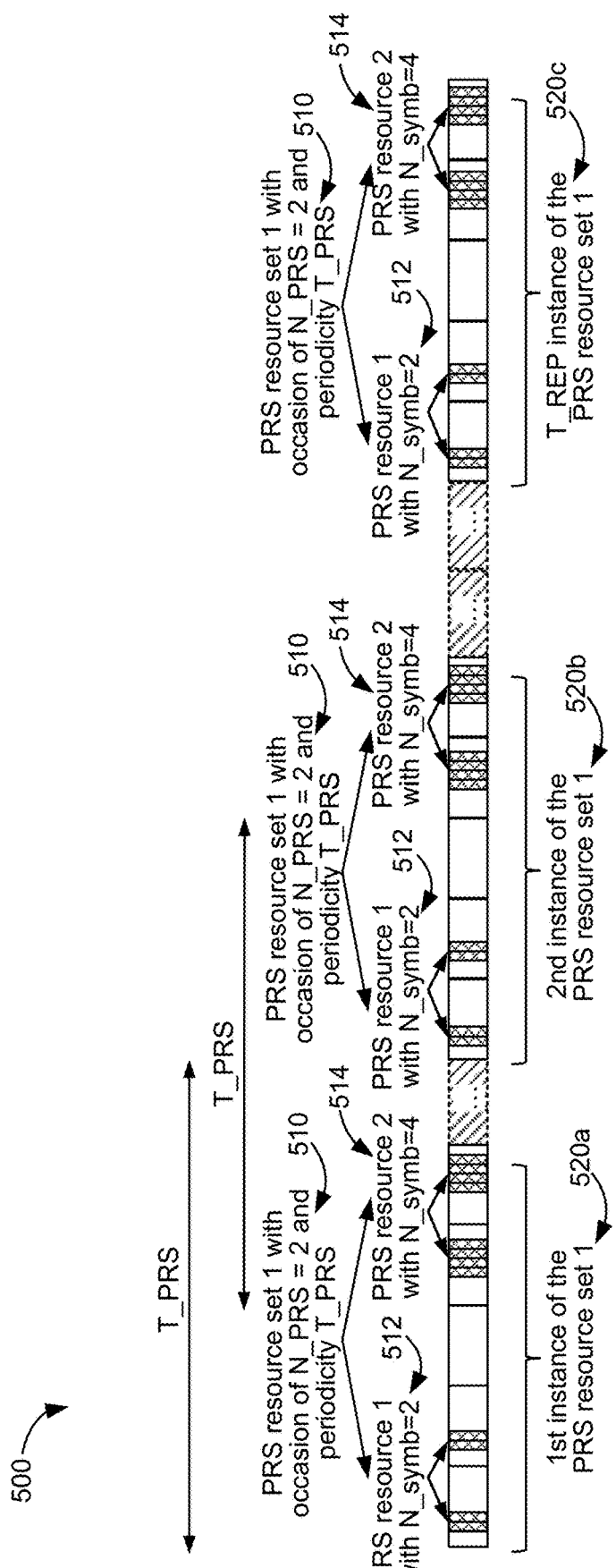
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520a, 520b, and 520c, includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520a, 520b, and 520c of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

A cellular repeater is used to improve network connectivity. A repeater commonly includes a donor antenna that receives downlink signals from nearby base stations and a rebroadcast antenna that transmits the downlink signals to one or more UEs. On the uplink, the rebroadcast antenna receives uplink signals from the one or more UEs and the donor antenna transmits the signals to the nearby base stations. Repeater communication can increase throughput, data rate, and cellular coverage, and is especially beneficial due to its ability to increase the diversity gain in a fading environment.

FIGS. 6A to 6D illustrate the differences between a repeater function and a relay function, as well as some technical challenges faced by conventional repeater and relay functions. As used herein, the generic term repeater/relay unit (RU) is used to refer to a network node that performs a repeater function, a relay function, or both. Where the RU does a particular function, repeater or relay, that will be so indicated.

Figure 6A:
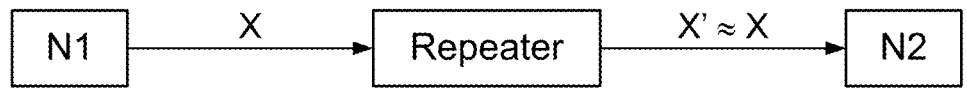
FIGS. 6A to 6D illustrate the differences between a repeater function and a relay function.

FIG. 6A shows a repeater function, in which a repeater receives a first signal (labeled "X") from a transmitter node (labeled "N1") and sends a second signal (labeled "X'") to a receiver node (labeled "N2"). In this scenario, the repeater essentially regenerates the signal X as X', for example, by duplicating the tones of X. From a signal processing point of view, X and X' would appear the same at the receiver node N2.

In one example, the transmitter node N1 may be a gNB and the receiver node N2 may be a UE, in which case, the connection between the gNB and the repeater is referred to as a fronthaul link, while the connection between the repeater and the UE is referred to as an access link. Thus, the examples illustrated in FIGS. 6A to 6D are referred to as integrated access fronthaul (IAF) networks.

Figure 6B:
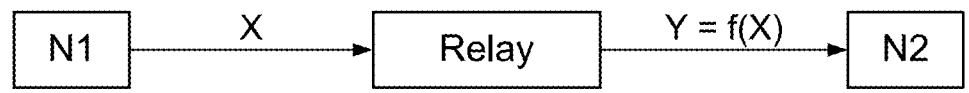

FIG. 6B shows a relay function, in which a relay node receives a first signal (labeled "X") from a transmitter node (labeled "N1") and generates a second signal (labeled "Y"), which carries information about or from the first signal X. The relay node does not replicate the tones of the original signal X, but instead, contains essentially the same content as the first signal X, but in a different form (represented as "f(X)"). As a downlink example, signal X may be a fronthaul physical downlink shared channel (FH-PDSCH) having a payload that carries some information (e.g., IQ samples), and signal Y may be a legacy PDSCH that is generated based upon that information. As an uplink example, signal X may be a legacy PUSCH and signal Y may be a FH-PUSCH having a payload that carries some information acquired from signal X.

Figure 6C:
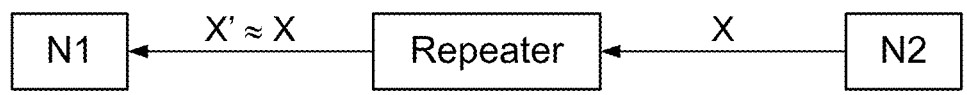
Figure 6D:
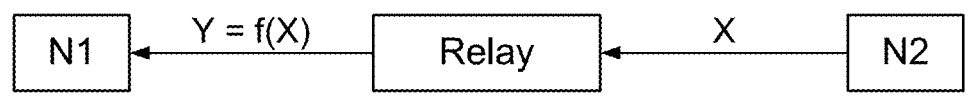

FIG. 6C shows the repeater of FIG. 6A, but with the roles of the transmitter node N1 and receiver node N2 reversed. Similarly, FIG. 6D shows the relay of FIG. 6C, but with the roles of the transmitter node N1 and receiver node N2 reversed.

Figure 7:
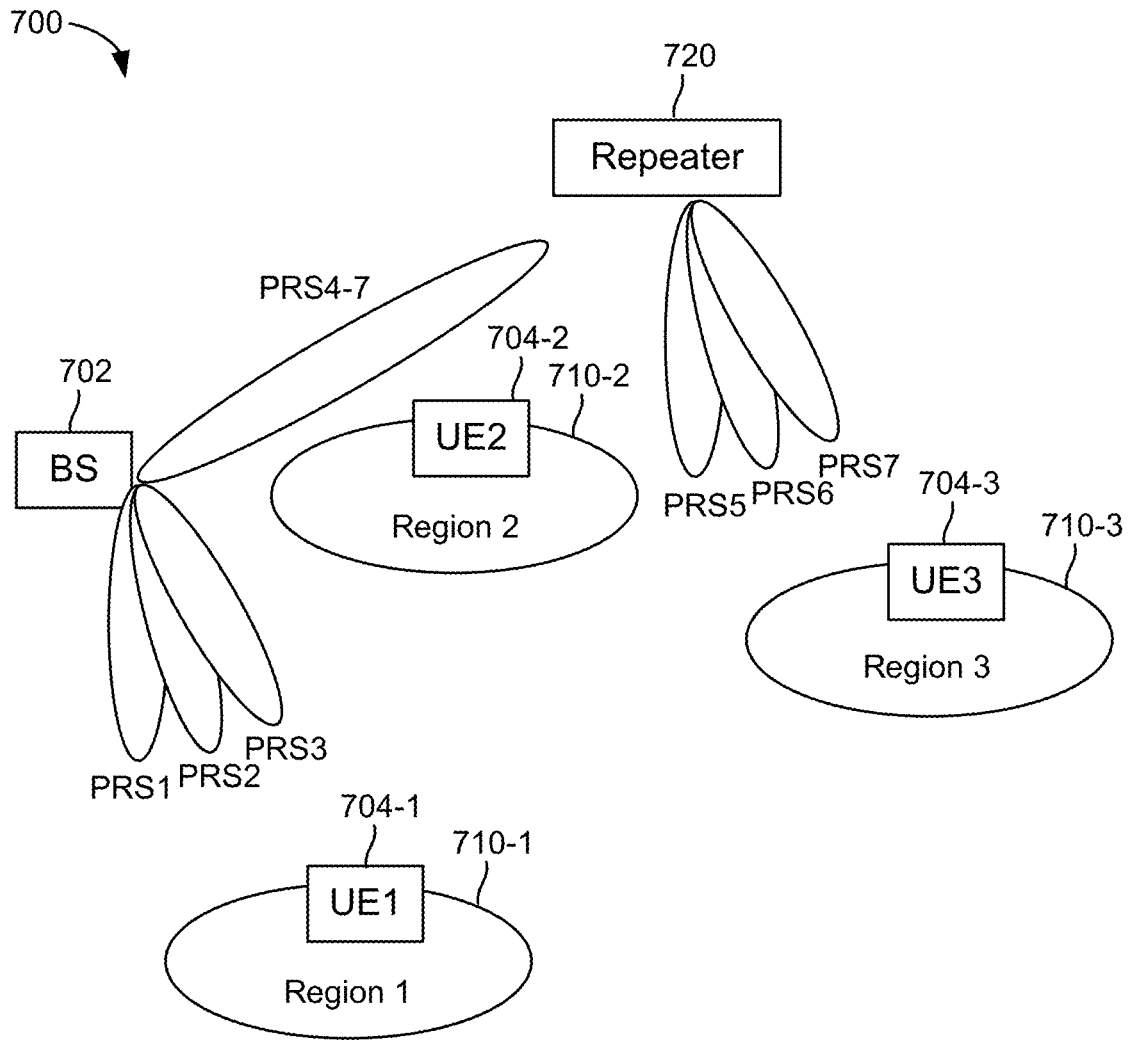
FIG. 7 is a diagram illustrating a wireless environment in which a base station is transmitting PRS to UEs in various geographical areas, according to aspects of the disclosure.

A repeater may serve as a PRS transmission point. If a repeater can repeat (or reflect or relay) a PRS, then the positioning entity can use the repeater as an anchor (i.e., a transmitter with a known location) for positioning a target UE. FIG. 7 is a diagram 700 illustrating a wireless environment in which a base station is transmitting PRS to UEs in various geographical areas, according to aspects of the disclosure. Specifically, a base station 702 is transmitting three PRS (labeled "PRS1," "PRS2," and "PRS3") towards a first UE 704-1 (labeled "UE1") in a first region 710-1 (labeled "Region 1") on three downlink transmit beams. The base station 702 is also transmitting four PRS (labeled "PRS4-7") on a single downlink transmit beam. One of the four PRS (labeled "PRS4") is configured to cover a second region 710-2 (labeled "Region 2") having a second UE 704-2 (labeled "UE2"), while the other three PRS (labeled "PRS5," "PRS6," and "PRS7") are configured to cover a third region 710-3 (labeled "Region 3") having a third UE 704-3 (labeled "UE3"). More specifically, the four PRS transmitted towards a repeater 720, which is configured to repeat (or reflect or relay) "PRS5," "PRS6," and "PRS7" towards the third region 710-3 on three downlink transmit beams. Thus, regions 710-1 and 710-2 are within the direct coverage area of the base station 702, while region 710-3 is out of direct coverage of the base station 702.

Note that while FIG. 7 illustrates a single UE 704 in each region 710, as will be appreciated, there may be more than one UE 704 in a region 710. In addition, while FIG. 7 illustrates the base station 702 transmitting seven PRS on four downlink transmit beams, as will be appreciated, there may be more or fewer than seven PRS and more or fewer than four beams.

The transmission of "PRS5" to "PRS7" from the base station 702 to the repeater 720 causes additional overhead for UE 704-2 in the second region 710-2, since the RF resources for that region are occupied by PRS transmission not destined for UEs 704-2 in that region. It would be preferable if these resources could be used for other purposes, such as data communication for UE 704-2. Accordingly, it would be beneficial to configure the signaling between the base station 702 and the repeater 720 so that the base station 702 can reallocate at least a portion of the RF resources directed towards the repeater 720 for other purposes.

As a first technique described herein, PRS transmission may be triggered by the network (e.g., controlling base station or location server). For this technique, the repeater is assumed to have its own baseband and therefore to be able to generate its own waveform (rather than just repeating a received waveform). In this technique, the base station or positioning entity (e.g., LMF 270) sends a PRS configuration (e.g., PRS configuration 500) to the repeater to enable the repeater to generate its own PRS waveform for the PRS configuration. The PRS configuration transmission between the base station and the repeater may reuse the same or similar NR positioning protocol type A (NRPPa) messages that are used between an LMF and a gNB for PRS configuration transmission.

Upon receiving the PRS configuration, the repeater may use its own baseband unit to generate the PRS waveform corresponding to the PRS configuration (i.e., the physical RF signal corresponding to the logical PRS configuration). Alternatively, the repeater may be preconfigured with one or more PRS waveforms so that the base station (or positioning entity) only needs to select the index value of the PRS waveform(s) to be transmitted by the repeater. The preconfigured PRS waveform(s) may be be generated by the base station (or positioning entity) and received at the repeater via a wireless channel or preloaded when the repeater is manufactured. Such a preconfiguration may be more beneficial for repeaters with a more simplified baseband design (e.g., a baseband that does not have the capability of translating a PRS configuration into a PRS waveform).

The base station (or positioning entity) may trigger the repeater to transmit a particular PRS waveform via a control link between the base station and the repeater. The trigger may include an indicator (ID) of the PRS waveform to be transmitted by the repeater. The trigger may also include a delay timer or counter (in slots, symbols, milliseconds, etc.) the repeater should wait before transmitting the PRS waveform. The trigger may also include information about timing error compensation, such as the timing error at the repeater and/or the base station. In an aspect, the timing error compensation may have a finer time granularity (e.g., nanoseconds) than the delay timer/counter.

Thus, with reference to FIG. 7, rather than transmitting "PRS5," "PRS6," and "PRS7" towards the repeater 720, the base station 702 would only need to send a trigger message to the repeater 720 indicating that the repeater 720 should transmit "PRS5," "PRS6," and "PRS7." As described above, in addition to identifying "PRS5," "PRS6," and "PRS7," the trigger message may also include a delay timer and/or timing error compensation information for each of the PRS to be transmitted. The delay timer and/or timing error compensation information may be different for each PRS, apply to all PRS, or apply to groups of PRS.

As a second technique, the base station may use compressed or out-of-band PRS transmission towards a repeater. This way, UEs between the base station and the repeater (e.g., UE 704-2 in the example of FIG. 7) will not receive, or at least not be able to decode (because they will not have the necessary configuration information), PRS transmitted from the base station to the repeater. For this technique, the repeater is assumed to have sufficient memory to store a received PRS waveform and to apply certain RF operations on the received waveform. In this technique, there are various options regarding how the base station can transmit PRS (i.e., the PRS waveform) to the repeater. As a first option, the PRS can be transmitted via out-of-band spectrum (i.e., frequency spectrum in which PRS are not transmitted). In this option, UEs between the base station and the repeater would not receive the PRS, and the full PRS spectrum would be available for data transmission. As a second option, the PRS can be transmitted as a compressed waveform. In this option, UEs between the base station and the repeater may still detect PRS that are not intended for them (but may not be able to decode the PRS correctly without knowledge of the compression algorithm), but the PRS would use fewer RF resources, allowing for more data transmission. As a third option, the PRS waveform can be scrambled. In this option, UEs between the base station and the repeater may still detect the PRS, but they will not be able to descramble them.

Figure 8A:
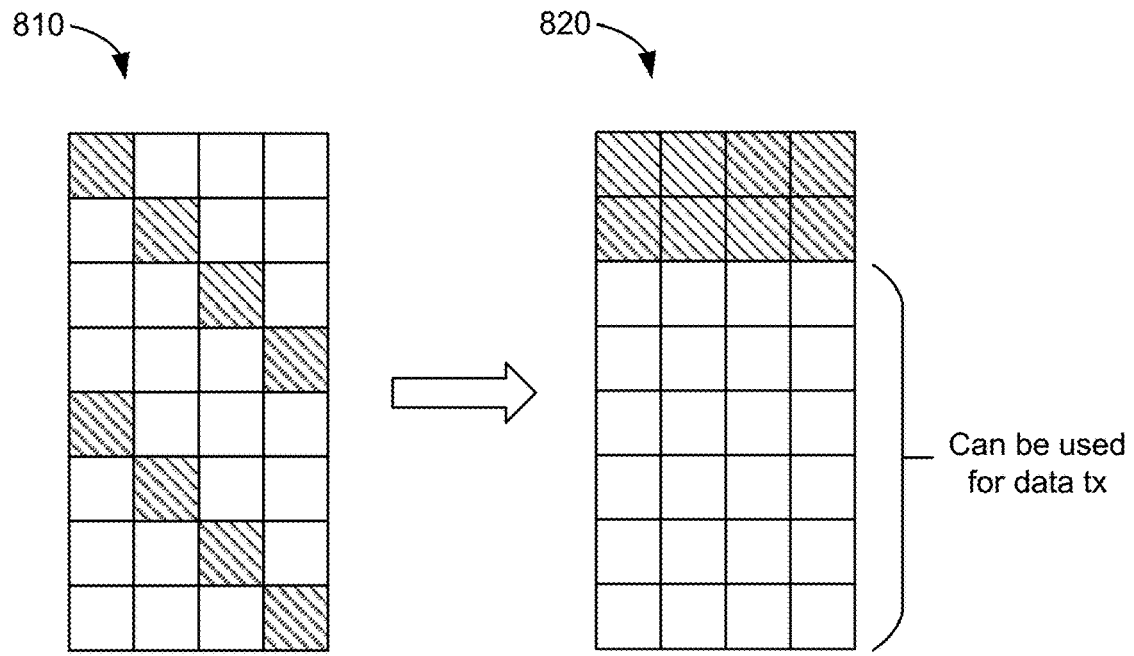
FIGS. 8A and 8B illustrate examples of removing empty tones from PRS, according to aspects of the disclosure.

As a fourth option, empty tones (subcarriers) in the staggered PRS comb pattern can be removed. FIG. 8A illustrates an example of removing empty tones from PRS, according to aspects of the disclosure. In FIG. 8A, each block represents a resource element (RE), and shaded resource elements carry PRS. As such, the shaded REs may correspond to a PRS resource. In the example of FIG. 8A, a PRS resource 810 has a comb-4 comb pattern over four symbols. The PRS resource 810 comprises two frequency domain repetitions, meaning the PRS resource 810 spans eight REs in the frequency domain. The empty tones in each symbol between the REs of the PRS resource 810 can be removed, resulting in the "compressed" PRS resource 820. Said another way, the staggered REs of the PRS resource 810 can be de-staggered, resulting in the PRS resource 820. The PRS resource 820 comprises two frequency domain repetitions of a comb-1 pattern over four symbols, resulting in the PRS resource 820 spanning two REs in the frequency domain. As shown in FIG. 8A, because the PRS resource 820 only occupies two REs in the frequency domain (instead of eight as for the PRS resource 810), the remaining REs can be used for data transmission.

As a fifth option, PRS configured over a larger bandwidth may be transmitted on a small bandwidth but over a longer time. For example, instead of removing only empty tones, as in the fourth option, the bandwidth used can be further reduced at the cost of using more symbols (e.g., the tones carrying PRS in one symbol may be split across two or more symbols). The resource mapping can be exchanged between the base station and the repeater in advance through control channels.

In an aspect, for the second technique, the base station can transmit PRS to the repeater using any one of the options described above, or any combination of the options described above.

For the signaling from the repeater to the UE, there are different options for how the PRS can be transmitted, depending on how the PRS was received from the base station. As a first option, where the PRS was received from the base station out-of-band, the repeater can transmit (re-peat/relay) the PRS by shifting the center frequency (CF) of the received PRS so that the PRS is in-band (i.e., within the configured PRS bandwidth). As a second option, where the PRS was received from the base station as a compressed waveform, the repeater can decompress the PRS waveform (based on assistance data from the base station or the location server) and transmit (repeat/relay) the decom-pressed waveform of the PRS. As a third option, where the PRS was received from the base station as a scrambled waveform, the repeater can descramble the PRS waveform (based on assistance data from the base station or the location server) and transmit (repeat/relay) the descrambled PRS waveform. As a fourth option, where the PRS was received from the base station as a de-staggered waveform (as in the example of FIG. 8A), the repeater can "re-stagger" the PRS waveform (i.e., insert the empty tones) and transmit a staggered PRS waveform. The repeater can "re-stagger" the PRS waveform based on assistance data from the base station or the location server (e.g., the comb pattern of the PRS).

By moving the PRS back in-band, decompressing the PRS waveform, descrambling the PRS waveform, or stag-gering the PRS waveform, the repeater transmits the PRS the UE(s) in the coverage area of the repeater is/are expecting to receive and measure. That is, the PRS received from the repeater will match the PRS configuration (e.g., PRS con-figuration 500) received from the base station or the location server as assistance data.

With reference to FIG. 7, the general principle of the fourth option described above is that "PRS5," "PRS6," and "PRS7" from the base station 702 to the repeater 720 use a lower comb pattern (resulting in higher frequency density), while "PRS5," "PRS6," and "PRS7" from the repeater 720 to the UE 704-3 use a higher comb (resulting in a lower frequency density). In an aspect, the lower comb PRS (here, "PRS5," "PRS6," and "PRS7") can serve UEs in the second region 710-2 as well (here, UE 704-2). These "compressed" PRS may have comb patterns that are similar to, but not the same as, the currently defined comb patterns.

Figure 8B:
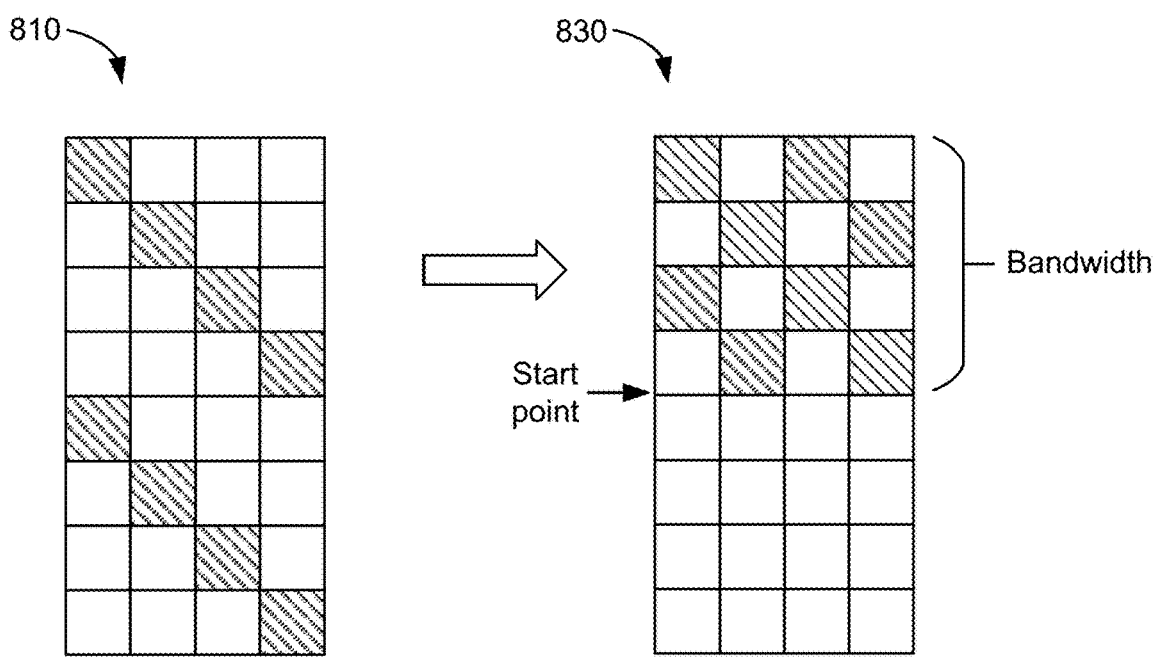

FIG. 8B illustrates another example of removing empty tones from PRS, according to aspects of the disclosure. FIG. 8B illustrates the PRS resource 810, which has a comb-4 comb pattern over four symbols. In the example of FIG. 8B, rather than remove all of the empty tones between the REs of the PRS resource 810, only a subset of the empty REs in each symbol are removed (two tones per symbol in FIG. 8B), resulting in a "compressed," or partially de-staggered, PRS resource 830. The PRS resource 830 has a comb-2 comb over four symbols comb pattern, which is similar to the currently defined 4-symbol comb-2 comb pattern, except that the RE mapping is different than the currently defined pattern. As in the example of FIG. 8A, because the PRS resource 830 only occupies four REs in the frequency domain (instead of eight as for the PRS resource 810), the remaining REs can be used for data transmission.

Where UEs between a base station and a repeater (e.g., UE 704-2 in the second region 710-2) are expected to measure compressed PRS transmitted to the repeater, the UEs need to be configured with assistance data to enable them to receive and decode/measure the PRS. However, because the "compressed" PRS may have comb patterns that are not the same as the currently defined comb patterns, new RE mappings would need to be defined to enable such UEs to receive and decode/measure the PRS properly.

In an aspect, the positioning entity (e.g., LMF 270) may signal the new PRS configuration to a UE via, for example, LPP. The new PRS configuration for PRS resources trans-mitted to the repeater may specify the bandwidth and start point of the REs of the PRS resource, the comb size, an indicator of the PRS resource type, and an expected RSTD (if applicable). The PRS resource type may be "compressed" or "normal" (indicating a currently supported PRS comb pattern). These parameters may be provided in higher layer (e.g., LPP) information elements that, for example, specify the frequency layer, the TRP configuration, and/or the PRS resource set.

Regarding the comb size, the stagger pattern may be defined for a specific comb size. In addition, the actual bandwidth of the compressed PRS may be derived based on the comb size of the compressed PRS transmitted to the repeater, the comb size of the normal PRS to be repeated/relayed by the repeater, and the PRS bandwidth. For example, the actual bandwidth may be based on the comb size of the PRS from the base station to the repeater divided by the comb size of the original PRS multiplied by the PRS bandwidth.

Regarding the expected RSTD, the expected RSTD of the compressed PRS received between the base station and the repeater may be different than the expected RSTD for other PRS from the same base station. More specifically, the expected RSTD of the compressed PRS may be earlier than the expected RSTD of the decompressed PRS transmitted by the repeater. This is to compensate for the internal processing delay of the repeater, which the compressed PRS does not experience but the decompressed PRS will.

In an aspect, the triggering mechanisms described above with reference to the first technique described herein may be used to trigger the PRS transmissions described above with reference to the second technique described herein.

Figure 9:
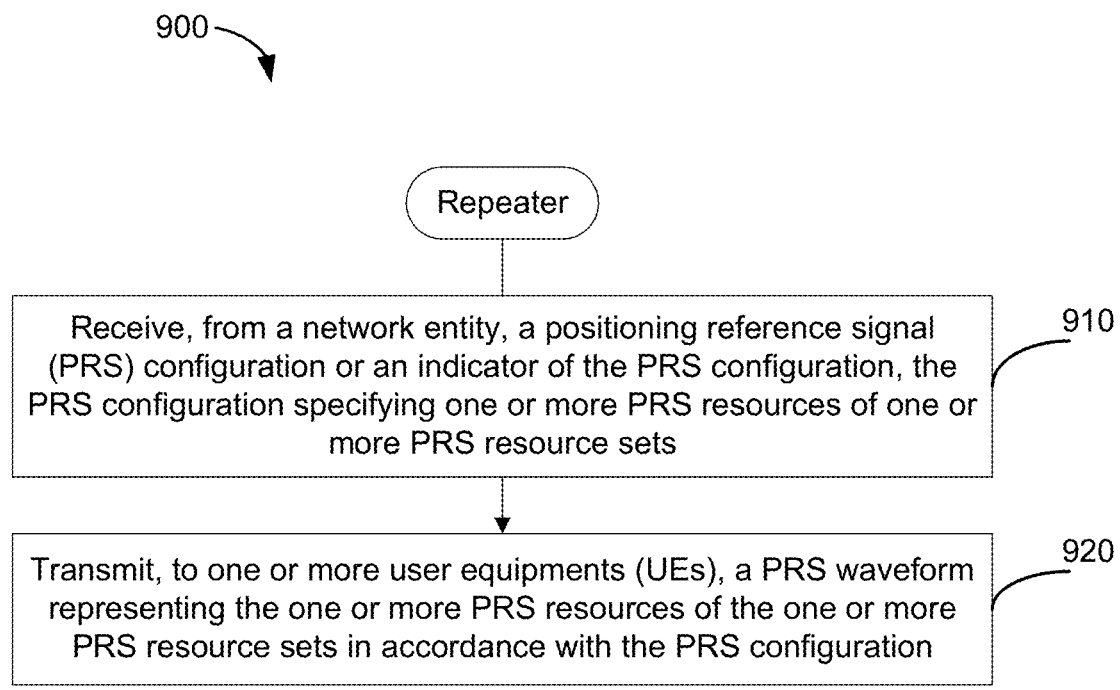
FIGS. 9 to 11 illustrate example methods of wireless communication, according to aspects of the disclosure.

FIG. 9 illustrates an example method 900 of wireless communication, according to aspects of the disclosure. In an aspect, method 900 may be performed by a repeater (e.g., any of the repeaters described herein).

At 910, the repeater receives, from a network entity (e.g., a base station or location server), a PRS configuration (e.g., PRS configuration 500) or an indicator of the PRS configuration, the PRS configuration specifying one or more PRS resources of one or more PRS resource sets. In an aspect, operation 910 may be performed by one or more WWAN transceivers of the repeater, one or more processors of the repeater, and/or a memory of the repeater, any or all of which may be considered means for performing this operation.

At 920, the repeater transmits, to one or more UEs (e.g., any of the UEs described herein), a PRS waveform representing the one or more PRS resources of the one or more PRS resource sets in accordance with the PRS configuration. In an aspect, operation 920 may be performed by one or more WWAN transceivers of the repeater, one or more processors of the repeater, and/or a memory of the repeater, any or all of which may be considered means for performing this operation.

Figure 10:
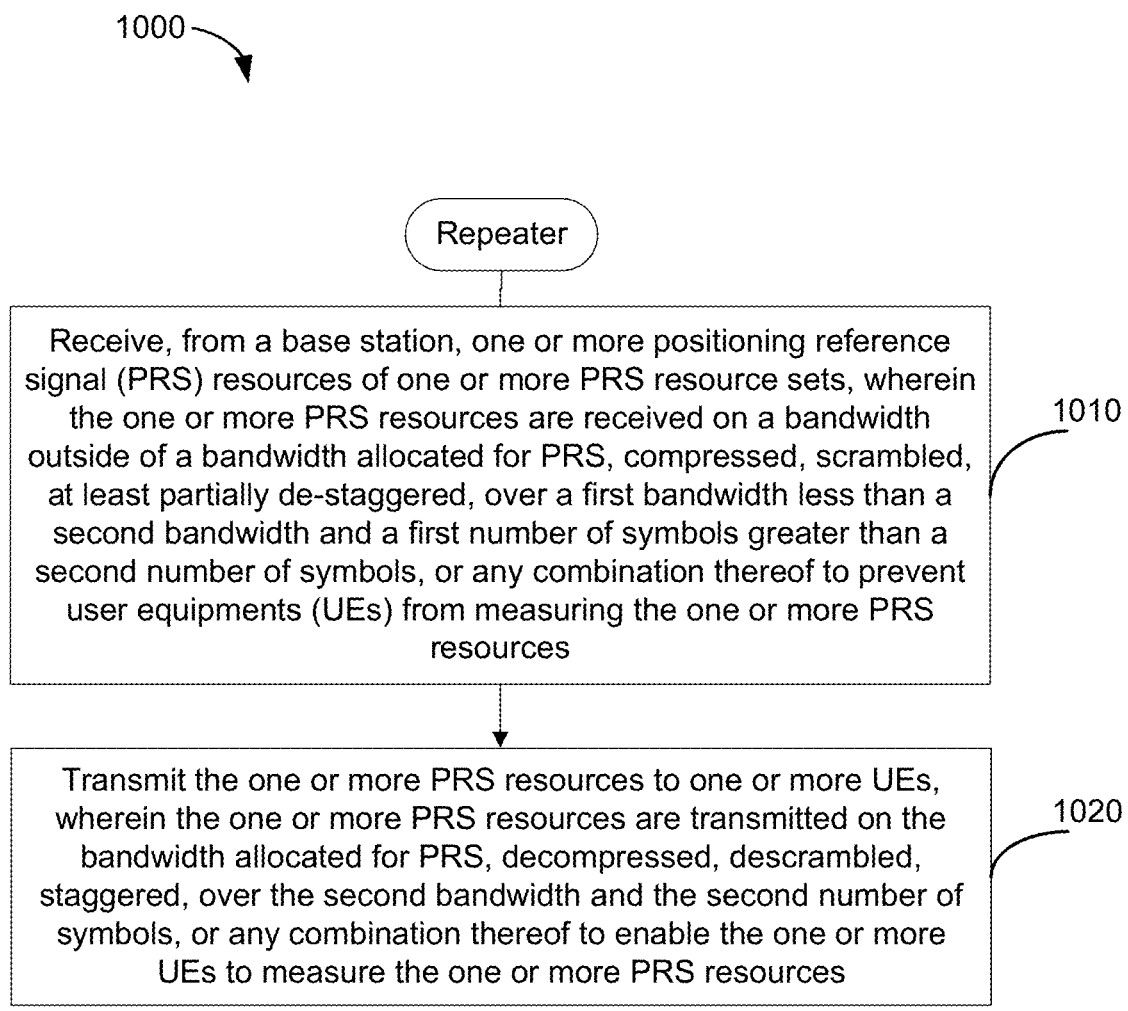

FIG. 10 illustrates an example method 1000 of wireless communication, according to aspects of the disclosure. In an aspect, method 1000 may be performed by a repeater (e.g., any of the repeaters described herein).

At 1010, the repeater receives, from a base station (e.g., any of the base stations described herein), one or more PRS resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent UEs (e.g., any of the UEs described herein) from measuring the one or more PRS resources. In an aspect, operation 1010 may be performed by one or more WWAN transceivers of the repeater, one or more processors of the repeater, and/or a memory of the repeater, any or all of which may be considered means for performing this operation.

At 1020, the repeater transmits the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources. In an aspect, operation 1020 may be performed by one or more WWAN transceivers of the repeater, one or more processors of the repeater, and/or a memory of the repeater, any or all of which may be considered means for performing this operation.

Figure 11:
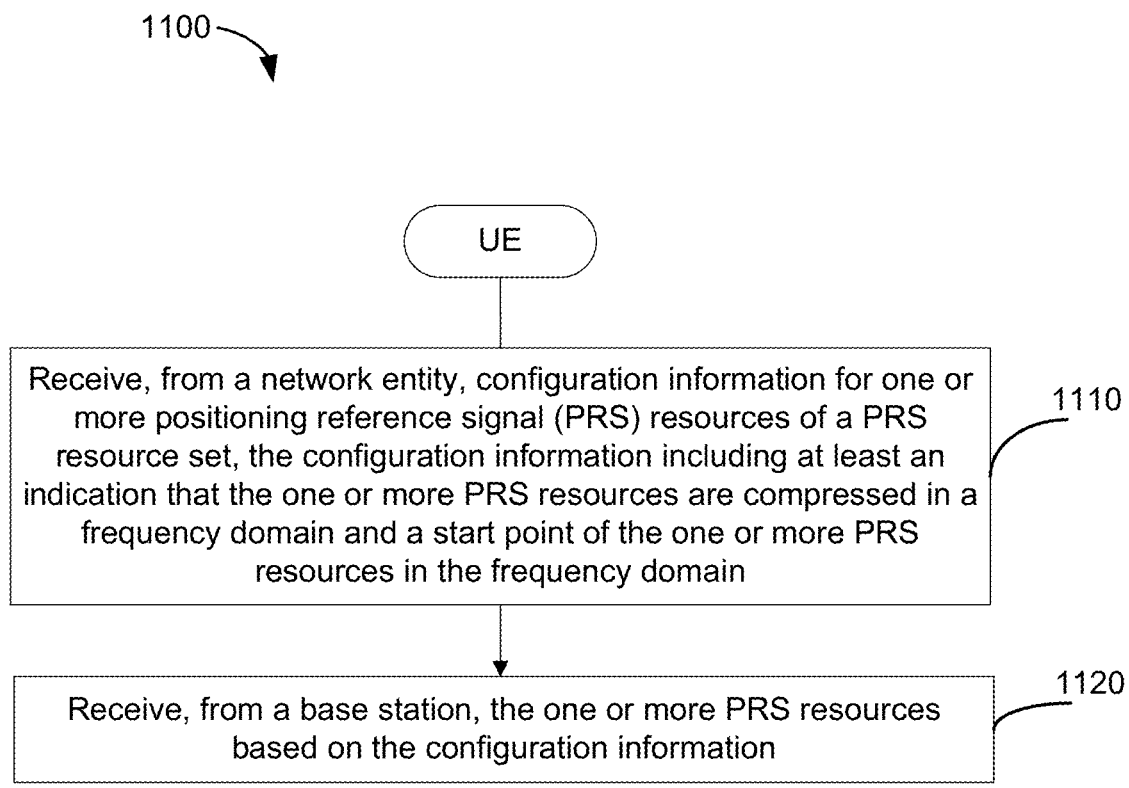

FIG. 11 illustrates an example method 1100 of wireless communication, according to aspects of the disclosure. In an aspect, method 1100 may be performed by a UE (e.g., any of the UEs described herein).

At 1110, the UE receives, from a network entity (e.g., a base station or location server), configuration information for one or more PRS resources of a PRS resource set, the configuration information including at least an indication that the one or more PRS resources are compressed in a frequency domain and a start point of the one or more PRS resources in the frequency domain. In an aspect, operation 1110 may be performed by the one or more WWAN transceivers 310, the one or more processors 332, memory 340, and/or positioning component 342, any or all of which may be considered means for performing this operation.

At 1120, the UE receives, from a base station, the one or more PRS resources based on the configuration information. In an aspect, operation 1120 may be performed by the one or more WWAN transceivers 310, the one or more processors 332, memory 340, and/or positioning component 342, any or all of which may be considered means for performing this operation.

As will be appreciated, a technical advantage of the methods 900 to 1100 is increased resource utilization due to compressing PRS transmissions in the frequency domain.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a repeater, comprising:
receiving, from a network entity, a positioning reference signal (PRS) configuration or an indicator of the PRS configuration, the PRS configuration specifying one or more PRS resources of one or more PRS resource sets; and
transmitting, to one or more user equipments (UEs), a PRS waveform representing the one or more PRS resources of the one or more PRS resource sets in accordance with the PRS configuration.

Clause 2. The method of clause 1, further comprising: generating the PRS waveform at a baseband unit of the repeater based on reception of the PRS configuration.

Clause 3. The method of clause 1, further comprising: retrieving the PRS waveform from a memory of the repeater based on reception of the indicator of the PRS configuration.

Clause 4. The method of clause 3, further comprising: receiving the PRS waveform from a base station; and storing the PRS waveform in the memory of the repeater, wherein the PRS waveform is associated with the indicator of the PRS configuration in the memory of the repeater.

Clause 5. The method of clause 3, wherein the PRS waveform is preloaded in the memory of the repeater.

Clause 6. The method of any of clauses 1 to 5, further comprising: receiving a delay timer from the network entity, the delay timer indicating an amount of time the repeater is expected to wait between reception of the PRS configuration or the indicator of the PRS configuration and transmission of the PRS waveform.

Clause 7. The method of clause 6, wherein the amount of time comprises a number of symbols, slots, subframes, or milliseconds.

Clause 8. The method of any of clauses 1 to 7, further comprising: receiving timing error compensation information indicating a timing error of the repeater, a timing error of a base station for which the repeater is transmitting the PRS waveform, or both.

Clause 9. The method of any of clauses 1 to 8, wherein receiving the PRS configuration or the indicator of the PRS configuration comprises: receiving the PRS configuration; and receiving the indicator of the PRS configuration, where reception of the indicator of the PRS configuration triggers transmission of the PRS waveform.

Clause 10. The method of any of clauses 1 to 9, wherein: the network entity is a location server, and the PRS configuration is received in one or more New Radio positioning protocol type A (NRPPa) messages.

Clause 11. The method of any of clauses 1 to 9, wherein: the network entity is a base station, and the PRS configuration is received in one or more radio resource control (RRC) messages.

Clause 12. A method of wireless communication performed by a repeater, comprising:

receiving, from a base station, one or more positioning reference signal (PRS) resources of one or more PRS resource sets, wherein the one or more PRS resources are received on a bandwidth outside of a bandwidth allocated for PRS, compressed, scrambled, at least partially de-staggered, over a first bandwidth less than a second bandwidth and a first number of symbols greater than a second number of symbols, or any combination thereof to prevent user equipments (UEs) from measuring the one or more PRS resources; and transmitting the one or more PRS resources to one or more UEs, wherein the one or more PRS resources are transmitted on the bandwidth allocated for PRS, decompressed, descrambled, staggered, over the second bandwidth and the second number of symbols, or any combination thereof to enable the one or more UEs to measure the one or more PRS resources.

Clause 13. The method of clause 12, wherein: the one or more PRS resources are at least partially de-staggered, the one or more PRS resources are received having a first comb size, the one or more PRS resources are transmitted having a second comb size, and the first comb size is smaller than the second comb size.

Clause 14. The method of clause 12, wherein the second bandwidth is a bandwidth configured for PRS transmission.

Clause 15. A method of wireless communication performed by a user equipment (UE), comprising: receiving, from a network entity, configuration information for one or more positioning reference signal (PRS) resources of a PRS resource set, the configuration information including at least an indication that the one or more PRS resources are compressed in a frequency domain and a start point of the one or more PRS resources in the frequency domain; and receiving, from a base station, the one or more PRS resources based on the configuration information.

Clause 16. The method of clause 15, wherein the configuration information further includes an expected reference signal time difference (RSTD) for the one or more PRS resources, the expected RSTD based on the one or more PRS resources being transmitted to a repeater for repetition to one or more other UEs.

Clause 17. The method of any of clauses 15 to 16, wherein the configuration information further includes a comb size of the one or more PRS resources.

Clause 18. The method of any of clauses 15 to 17, wherein the configuration information indicates a stagger pattern for resource elements of the one or more PRS resources.

Clause 19. The method of any of clauses 15 to 18, wherein the configuration information indicates a bandwidth of the one or more PRS resources.

Clause 20. The method of clause 19, wherein the bandwidth of the one or more PRS resources is based, at least in part, on a comb size of the one or more PRS resources.

Clause 21. The method of any of clauses 15 to 20, further comprising: performing one or more positioning measurements of the one or more PRS resources based on the configuration information.

Clause 22. An apparatus comprising a memory, at least one transceiver, and at least one processor communicatively coupled to the memory and the at least one transceiver, the memory, the at least one transceiver, and the at least one processor configured to perform a method according to any of clauses 1 to 21.

Clause 23. An apparatus comprising means for performing a method according to any of clauses 1 to 21.

Clause 24. A non-transitory computer-readable medium storing computer-executable instructions, the computer-executable comprising at least one instruction for causing a computer or processor to perform a method according to any of clauses 1 to 21.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a repeater, comprising:
   receiving, from a network entity, a downlink positioning reference signal (DL-PRS) configuration or an indicator of the DL-PRS configuration, the DL-PRS configuration specifying one or more DL-PRS resources of one or more DL-PRS resource sets;
   receiving a delay timer from the network entity, the delay timer indicating an amount of time the repeater is expected to wait between reception of the DL-PRS configuration or the indicator of the DL-PRS configuration and transmission of a DL-PRS waveform; and
   transmitting, to one or more user equipments (UEs), the DL-PRS waveform representing the one or more DL-PRS resources of the one or more DL-PRS resource sets in accordance with the DL-PRS configuration and the delay timer.

2. The method of claim 1, further comprising:
   generating the DL-PRS waveform at a baseband unit of the repeater based on reception of the DL-PRS configuration.

3. The method of claim 1, further comprising:
   retrieving the DL-PRS waveform from a memory of the repeater based on reception of the indicator of the DL-PRS configuration.

4. The method of claim 3, further comprising:
   receiving the DL-PRS waveform from a base station; and
   storing the DL-PRS waveform in the memory of the repeater, wherein the DL-PRS waveform is associated with the indicator of the DL-PRS configuration in the memory of the repeater.

5. The method of claim 3, wherein the DL-PRS waveform is preloaded in the memory of the repeater.

6. The method of claim 1, wherein the amount of time comprises a number of symbols, slots, subframes, or milliseconds.

7. The method of claim 1, further comprising:
   receiving timing error compensation information indicating a timing error of the repeater, a timing error of a base station for which the repeater is transmitting the DL-PRS waveform, or both.

8. The method of claim 1, wherein receiving the DL-PRS configuration or the indicator of the DL-PRS configuration comprises:
   receiving the DL-PRS configuration; and
   receiving the indicator of the DL-PRS configuration, where reception of the indicator of the DL-PRS configuration triggers transmission of the DL-PRS waveform.

9. The method of claim 1, wherein:
the network entity is a location server, and
the DL-PRS configuration is received in one or more New Radio positioning protocol type A (NRPPa) messages.

10. The method of claim 1, wherein:
the network entity is a base station, and
the DL-PRS configuration is received in one or more radio resource control (RRC) messages.

11. A repeater, comprising:
at least one memory;
at least one transceiver; and
at least one processor communicatively coupled to the at least one memory and the at least one transceiver, the at least one processor configured to:
receive, via the at least one transceiver, from a network entity, a downlink positioning reference signal (DL-PRS) configuration or an indicator of the DL-PRS configuration, the DL-PRS configuration specifying one or more DL-PRS resources of one or more DL-PRS resource sets;
receive, via the at least one transceiver, a delay timer from the network entity, the delay timer indicating an amount of time the repeater is expected to wait between reception of the DL-PRS configuration or the indicator of the DL-PRS configuration and transmission of a DL-PRS waveform; and
transmit, via the at least one transceiver, to one or more user equipments (UEs), the DL-PRS waveform representing the one or more DL-PRS resources of the one or more DL-PRS resource sets in accordance with the DL-PRS configuration and the delay timer.

12. The repeater of claim 11, wherein the at least one processor is further configured to:
generate the DL-PRS waveform at a baseband unit of the repeater based on reception of the DL-PRS configuration.

13. The repeater of claim 11, wherein the at least one processor is further configured to:
retrieve the DL-PRS waveform from a memory of the repeater based on reception of the indicator of the DL-PRS configuration.

14. The repeater of claim 13, wherein the at least one processor is further configured to:
receive, via the at least one transceiver, the DL-PRS waveform from a base station; and
store the DL-PRS waveform in the memory of the repeater, wherein the DL-PRS waveform is associated with the indicator of the DL-PRS configuration in the memory of the repeater.

15. The repeater of claim 13, wherein the DL-PRS waveform is preloaded in the memory of the repeater.

16. The repeater of claim 11, wherein the amount of time comprises a number of symbols, slots, subframes, or milliseconds.

17. The repeater of claim 11, wherein the at least one processor is further configured to:
receive, via the at least one transceiver, timing error compensation information indicating a timing error of the repeater, a timing error of a base station for which the repeater is transmitting the DL-PRS waveform, or both.

18. The repeater of claim 11, wherein the at least one processor configured to receive the DL-PRS configuration or the indicator of the DL-PRS configuration comprises the at least one processor configured to:
receive, via the at least one transceiver, the DL-PRS configuration; and
receive, via the at least one transceiver, the indicator of the DL-PRS configuration, where reception of the indicator of the DL-PRS configuration triggers transmission of the DL-PRS waveform.

* * * * *